Jan. 2, 1962  W. W. WARD  3,015,433
EXHAUST POWER
Filed March 13, 1959  2 Sheets-Sheet 2
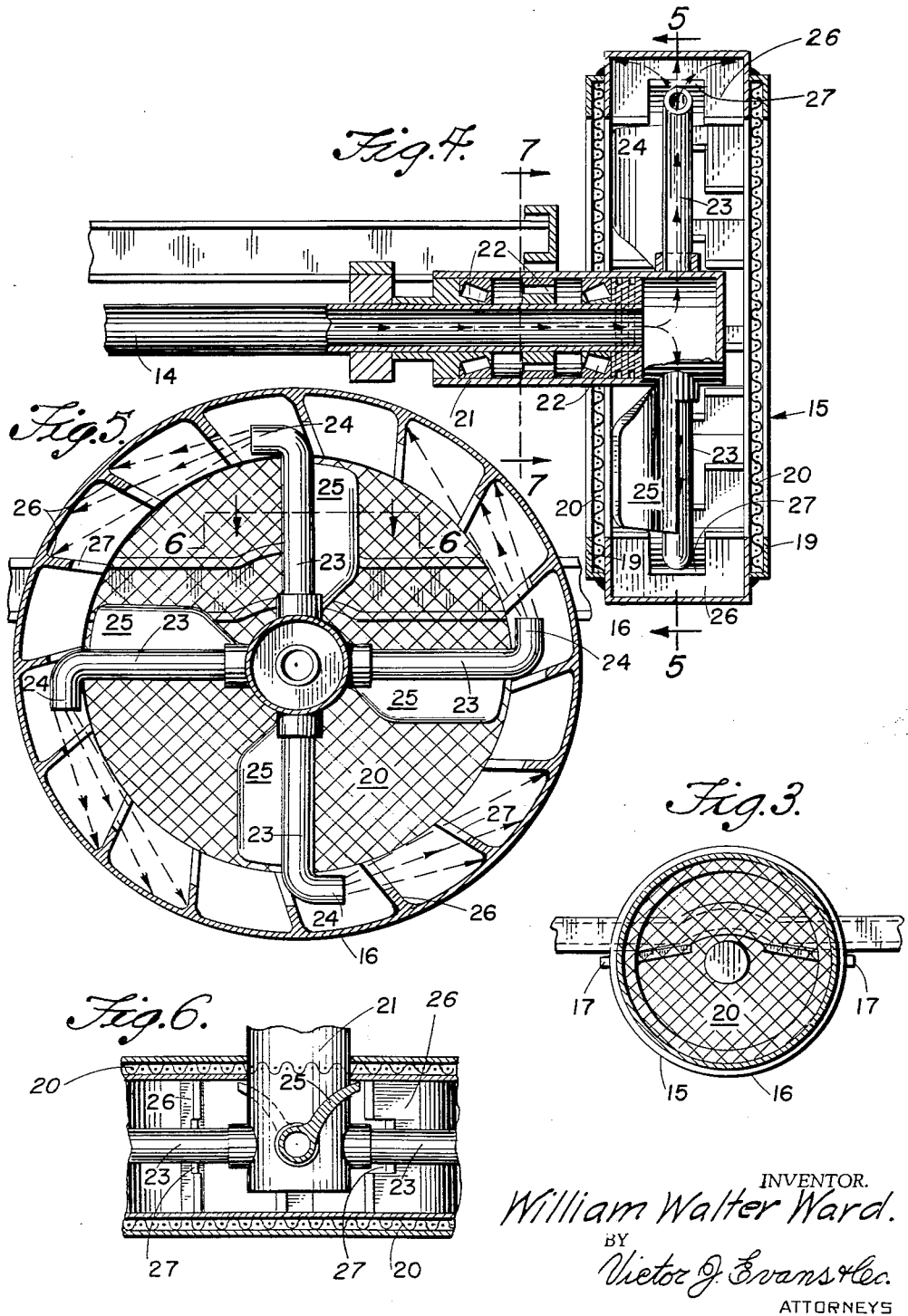
INVENTOR.
William Walter Ward.
BY
Victor J. Evans & Co.
ATTORNEYS

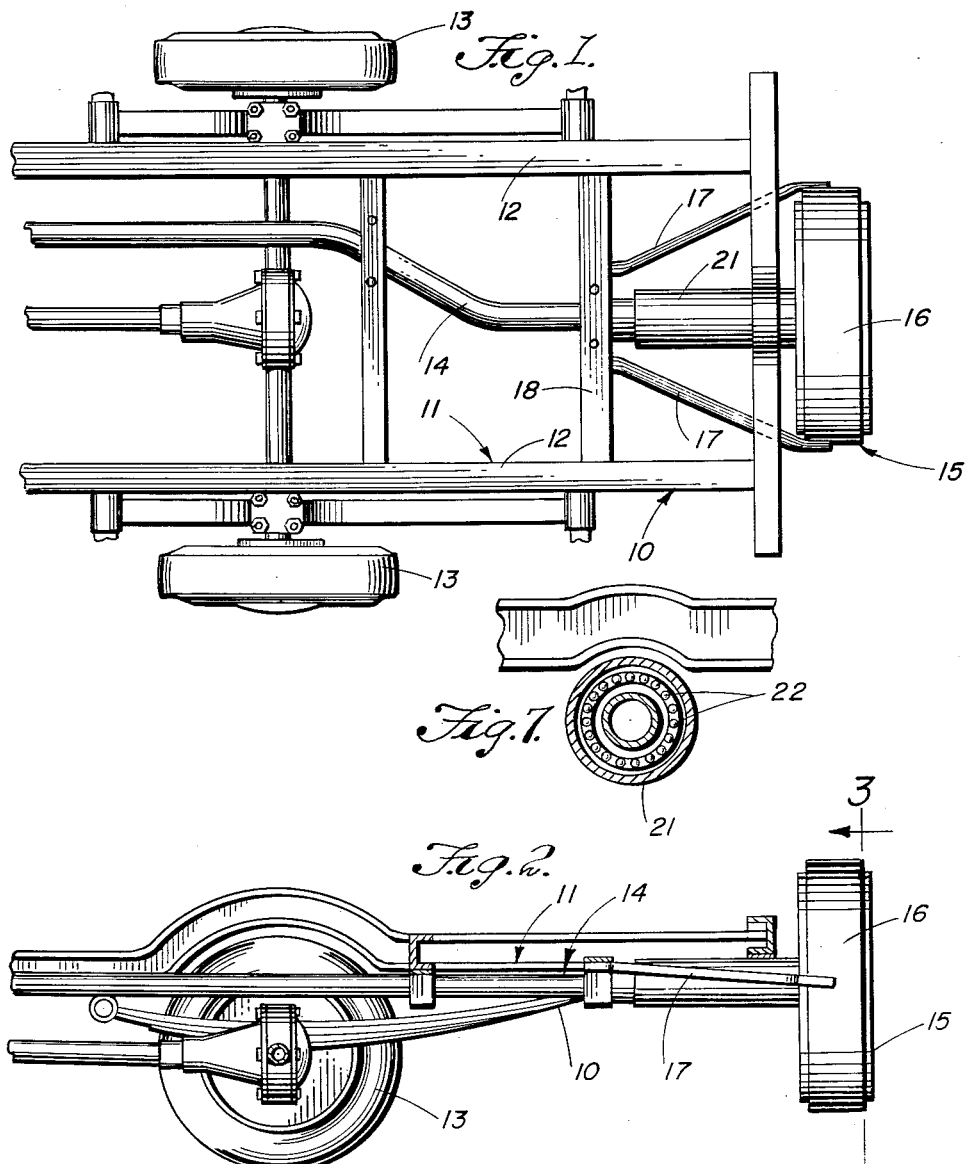

3,015,433
EXHAUST POWER
William Walter Ward, 1485 S. High St., Columbus 7, Ohio
Filed Mar. 13, 1959, Ser. No. 799,282
2 Claims. (Cl. 230—116)

This invention relates to a vehicle, and more particularly to a means for utilizing the exhaust power or exhaust gas from the vehicle.

The object of the invention is to provide a device which is adapted to be mounted on the rear end of the exhaust pipe of a conventional vehicle such as an automobile, truck or the like, whereby the exhaust power which is normally wasted can be used for propelling or operating members which will permit the vehicle to operate with greater efficiency or speed so that a saving in fuel economy will be provided.

Another object of the invention is to provide a vehicle exhaust pipe attachment which includes members that will rotate due to the expulsion or discharge of exhaust gases and wherein these rotating members can be used to provide additional power for propelling the vehicle in a forward direction so that a means is provided for utilizing the power or energy which is normally lost or wasted by the exhaust gases.

A further object of the invention is to provide a vehicle exhaust power device which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a plan view showing the chassis of a vehicle and showing the attachment of the present invention mounted on the rear end of the vehicle exhaust pipe.

FIGURE 2 is a view taken at right angles to the view shown in FIGURE 1.

FIGURE 3 is a sectional view taken on the line 3—3 of FIGURE 2

FIGURE 4 is a fragmentary sectional view illustrating the present invention.

FIGURE 5 is a sectional view taken on the line 5—5 of FIGURE 4.

FIGURE 6 is a sectional view taken on the line 6—6 of FIGURE 5.

FIGURE 7 is a sectional view taken on the line 7—7 of FIGURE 4.

Referring in detail to the drawings, the numeral 10 indicates a portion of a conventional vehicle which may be an automobile, truck or the like, and the vehicle 10 includes the usual chassis 11, which embodies beams 12, as well as the rear wheels 13, and the numeral 14 indicates the vehicle exhaust pipe.

The exhaust power attachment of the present invention is indicated generally by the numeral 15, and the attachment 15 comprises a stationary housing 16 of cylindrical formation, and the housing 16 is secured in any suitable manner, to the front ends of a pair of spaced apart braces 17, the rear ends of the braces 17 being secured to a crossbar 18 which extends between the beams 12.

The housing 16 is provided with flanges 19 which serve to support a pair of spaced parallel screen members 20, FIGURE 4. The numeral 21 indicates a rotary casing of cylindrical formation which has bearings 22 arranged therein.

Extending outwardly from the rotary casing 21 and secured thereto is a plurality of radially disposed tubes or conduits 23, and each of the conduits 23 includes a transverse end portion 24 which has an opening therein for the passage therethrough of the exhaust gas. A paddle or blade 25 is secured to or formed integral with each tube 23.

Positioned within the stationary housing 16 and secured thereto or formed integral therewith is a plurality of similar spaced apart blades or vanes 26, and the vanes 26 are provided with cutouts or cutaway portions 27 to provide clearance for the transverse end portions 24 of the tubes 23.

From the foregoing, it is apparent that there has been provided an attachment which is adapted to be mounted on the rear end of the exhaust pipe 14 of the vehicle 10 whereby the vehicle can utilize the exhaust power which is normally wasted in order to help propel the vehicle whereby the vehicle can be operated in a more efficient manner, and whereby a savings in fuel will be effected.

According to the present invention, the attachment 15 is adapted to be arranged so that the exhaust pipe 14 extends into the casing 21, and the bearings 22 provide a rotatable support for the rotary casing 21. The housing 16 is stationary and is secured to the braces 17. Thus, when the engine of the vehicle is operating, the exhaust gases will pass out through the pipe 14, and this exhaust gas will then pass outwardly through the tubes 23 and then through the portions 24. As shown in FIGURE 5 for example, some of these exhaust gases which are issuing out through the portions 24 of the tubes 23 will impinge against the vanes 26, and since the vanes 26 are stationary along with the housing 16, it will be seen that the tubes 23 will rotate and this rotation of the tubes will give an added impetus to the forward motion of the vehicle.

The tubes 23 have affixed thereto the paddles or blades 25, and these blades help increase the efficiency of the device so that the exhaust gases will be used in the most advantageous manner to provide additional power for propelling the vehicle forwardly. Thus, with the present invention the exhaust gas which is normally discharged out through the exhaust pipe 14 and which is normally wasted, is utilized to operate the attachment 15 so that for example the vehicle can be operated more economically and efficiently.

The parts can be made of any suitable material and in different shapes or sizes.

In use, the tubes 23 will spin like an airplane propeller to push the vehicle forwardly, whereby fuel or gasoline can be saved or economized on. The gas issuing from the portions 24 functions by passing out in a tangential manner under pressure so as to give impulse to the tubes 23. The screen members 20 function as safety devices so as to prevent a person's hand for example from getting injured or caught in the revolving members such as the members 23.

When the present invention is mounted on a vehicle exhaust pipe, the vehicle will be able to run more efficiently and for example, a suction effect will be created which will tend to arrange the air in the vicinity of the device in such a manner that resistance will be reduced so that drag or the like will be minimized. The device includes the stationary casing which is held in place by the braces, and the screens prevent a person from accidentally putting his hands in contact with the blades, the blades being provided with cutouts or openings so as to let the exhaust gas pass therethrough, and a fan-like effect is created which helps cause the vehicle to move with greater efficiency.

Minor changes in shape, size and rearrangement of details coming within the field of invention claimed may be resorted to in actual practice, if desired.

I claim:
1. In a device of the character described, a crosspiece, an exhaust pipe, spaced apart braces connected to said crosspiece, a stationary housing affixed to the rear ends of said braces, flanges on opposite sides of said housing, screen members mounted in said flanges, a plurality of stationary spaced apart vanes mounted within said housing, said vanes being provided with registering central cutouts, a rotary cylindrical casing mounted on said exhaust pipe, and a plurality of radially disposed tubes affixed to said casing, said tubes having transverse end portions which are mounted for movement through the cutouts in said vanes.

2. In a device of the character described, a crosspiece, an exhaust pipe, spaced apart braces connected to said crosspiece, a stationary housing affixed to the rear ends of said braces, a plurality of flanges on opposite sides of said housing, screen members mounted in said flanges, a plurality of stationary vanes of similar construction arranged in spaced apart relation with respect to each other, and said vanes being positioned within said housing, said vanes being provided with registering central cutouts, a rotary cylindrical casing mounted on said exhaust pipe, a plurality of radially disposed tubes affixed to said casing, said tubes having transverse end portions which are mounted for movement through the cutouts in said vanes, and blades affixed to said tubes.

References Cited in the file of this patent

UNITED STATES PATENTS

| | | |
|---|---|---|
| 36,164 | Monson | Aug. 12, 1862 |
| 608,377 | McIntosh | Aug. 2, 1898 |
| 709,961 | Bush | Sept. 30, 1902 |
| 1,065,985 | Swem | July 1, 1913 |
| 1,329,387 | Fay | Feb. 3, 1920 |
| 1,450,197 | Zwickey | Apr. 3, 1923 |
| 1,583,621 | Steinberg | May 4, 1926 |
| 2,904,298 | Tateishi | Sept. 15, 1959 |

FOREIGN PATENTS

| | | |
|---|---|---|
| 3,289 | Great Britain | of 1866 |
| 477,449 | Great Britain | Dec. 30, 1937 |
| 1,079,681 | France | May 19, 1954 |